United States Patent [19]

Ryczek

[11] Patent Number: 5,301,602
[45] Date of Patent: Apr. 12, 1994

[54] FAT-FREE ROASTER FOR POULTRY AND MEAT

[75] Inventor: Wlodzimierz Ryczek, Warsaw, Poland

[73] Assignee: Marcin P. Mieloszyk, Brooklyn, N.Y.

[21] Appl. No.: 40,649

[22] Filed: Mar. 31, 1993

[30] Foreign Application Priority Data

Apr. 3, 1992 [PL] Poland ................................ P.291040

[51] Int. Cl.⁵ ........................ A47J 37/04; A47J 43/18
[52] U.S. Cl. ...................................... 99/345; 99/346; 99/419; 99/426; 99/446
[58] Field of Search ................ 99/426, 446, 419, 425, 99/421 HV, 421 V, 410, 449, 450, 345–347, 401, 415–418; 211/126, 181, 59.1, 70.1, 13, 119; 426/509, 523

[56] References Cited

U.S. PATENT DOCUMENTS

| | | | |
|---|---|---|---|
| 1,339,625 | 5/1920 | Holloway | 99/346 |
| 1,349,302 | 8/1920 | Spitz | 99/346 |
| 2,821,904 | 2/1958 | Arcabosso | 99/346 |
| 3,020,824 | 2/1962 | Pantermoller | 99/346 |
| 3,392,665 | 7/1968 | Harnest | 99/426 |
| 3,713,378 | 1/1973 | West et al. | 99/346 |
| 4,450,759 | 5/1984 | Steibel | 99/419 |
| 4,633,773 | 1/1987 | Jay | 99/446 |
| 4,709,626 | 12/1987 | Hamlyn | 99/449 |
| 5,081,916 | 1/1992 | Kuhling et al. | 99/419 |
| 5,106,642 | 4/1992 | Ciofalo | 426/523 |

FOREIGN PATENT DOCUMENTS

| | | | |
|---|---|---|---|
| 448795 | 8/1927 | Fed. Rep. of Germany | 99/346 |
| 3241107 | 5/1984 | Fed. Rep. of Germany | 99/419 |

Primary Examiner—Timothy F. Simone
Attorney, Agent, or Firm—Schweitzer Cornman & Gross

[57] ABSTRACT

A vertical roasting apparatus is provided wherein a predetermined supply of liquid for generating the moisture required to produce a high quality and flavorful roasting of the meat is included in a reservoir formed within the support structure itself and disposed internally of the poultry or meat being roasted. The amount of liquid supplied for generating moisture is directly related to the uncooked weight of the poultry or meat to be roasted. The apparatus includes a scale provided integrally therewith and calibrated to indicate the proper level of fill in the reservoir for a particular uncooked weight of poultry/meat.

5 Claims, 1 Drawing Sheet

FAT-FREE ROASTER FOR POULTRY AND MEAT

BACKGROUND AND SUMMARY OF THE INVENTION

The present invention is directed to improvements in vertical roasting apparatus for use in closed ovens. Vertical racks or supports for oven roasting of poultry and meat are well known to the art and examples of such devices are shown in U.S. Pat. Nos.: Ciofalo 5,106,642; Finizie 2,587,133; Steibel 4,450,759; Schlessel 5,069,117; Kühling et al. 5,081,916; Hamlyn 4,709,626; Jay 4,633,773; Rosenkrantz Des. 286,498; Schmengler Des. 322,911; Spanek et al. 4,027,583; and Harnest 3,392,665.

It has been determined that fat-free roasting is enhanced by the apparatus of the present invention by virtue of the fact that effective fat-free roasting requires the constant moistening of the poultry or meat being roasted during the cooking process. Furthermore, the amount of moisture and the method by which the roasting poultry or meat is moistened directly influences the quality and flavor of the cooked poultry or meat as well as the overall cooking time.

SUMMARY OF THE INVENTION

In accordance with the principles of the present invention, a new and improved vertical roasting apparatus is provided wherein a predetermined supply of liquid for generating the moisture required to produce a high quality and flavorful roasting of the meat is included in a reservoir formed within the support structure itself and disposed internally of the poultry or meat being roasted. As a more specific aspect of the present invention, the amount of liquid supplied for generating moisture is directly related to the uncooked weight of the poultry or meat to be roasted. Advantageously, the new apparatus includes a scale provided integrally therewith and calibrated to indicate the proper level of fill in the reservoir for a particular uncooked weight of poultry/meat.

More specifically, in a preferred embodiment, the new and improved apparatus includes a pan generally circular in shape and having an opening in the bottom thereof, which opening is defined by a conical base which base itself supports a separate heat-resistant glass truncated cone. Importantly, the upper portion of the glass cone forms an integral reservoir for the liquid chosen to moisten the meat during the roasting process. The aforementioned calibrations of liquid amounts for predetermined meat weights may be directly etched onto the upper portion of the glass support. For better understanding of the present invention and more complete appreciation of the attendant advantages to be derived from its use, reference should be made to the accompanying drawing.

DETAILED DESCRIPTION OF THE INVENTION

Figure 1:
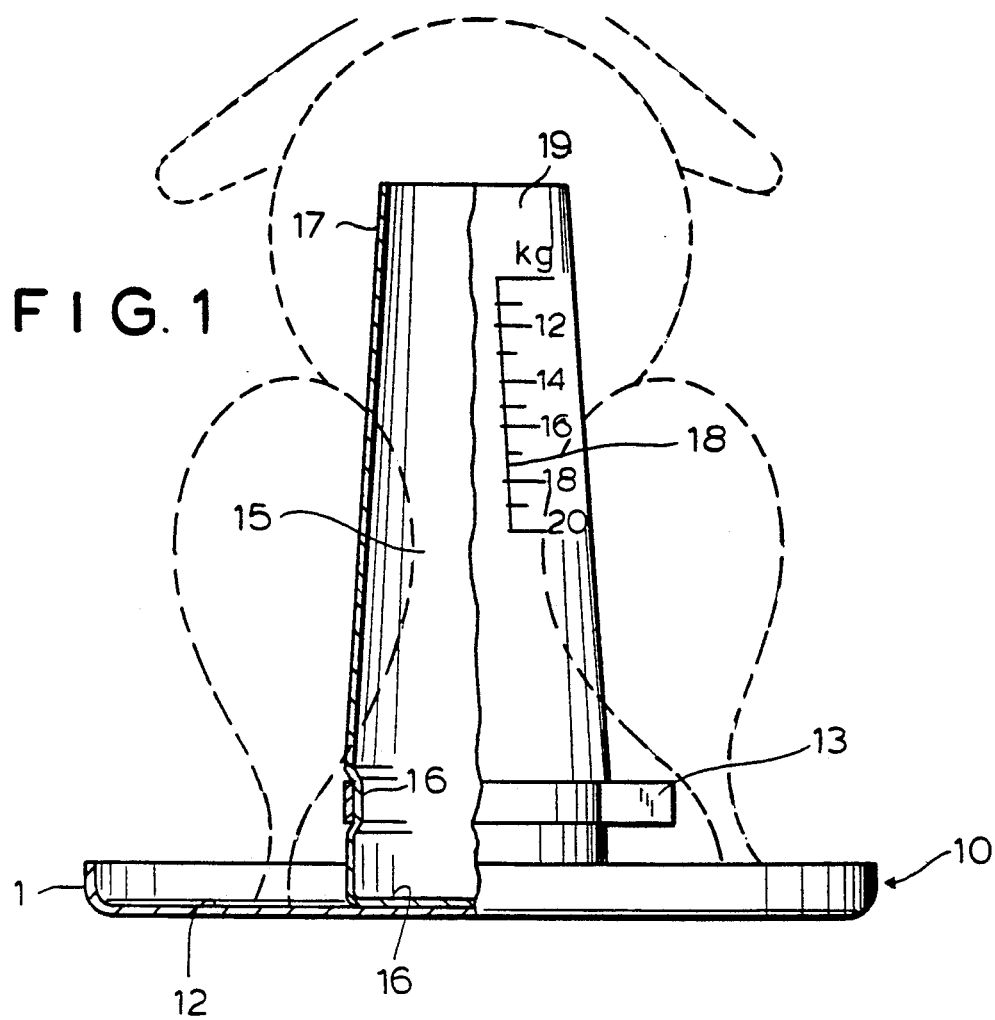
FIG. 1 is a schematic illustration, with the left half in cross-section and the right half in elevation, of one embodiment of a roasting apparatus embodying the principles of the invention.

Referring now to FIG. 1, one version of the new and improved roasting apparatus of the present invention comprises a shallow roasting pan having an upstanding circumscribing side wall 11 and a flat bottom. The pan 10 is formed from a heat conducting material such as aluminum, steel, or glass and further includes a clip member 13 which is cantilevered or otherwise fastened to the pan for the purposes of attaching a vertical, hollow cylindrical heat-resistant glass support cone member 15. In accordance with the invention, the glass member 15 has an annular depression 16' formed at the lower portions thereof so that it may be engaged by the clip 13 and held securely within the pan. The hollow cone 15 has a planar bottom 16 which itself rests on the bottom 12 of the pan 10. More specifically, the cone 15 is essentially an open vessel, the side walls 17 of which cooperate with the bottom 16 to form a reservoir 19 for liquid. Inscribed on the outer side walls 17 is a calibrated scale 18 indicating a series of fill levels which are related to uncooked poultry/meat weights. In this manner, the reservoir 19 may be filled with liquid (water, wine, or a combination of flavoring agents and cooking fluids) up to a particular calibrated level on the scale 18 in accordance with the particular weight of the poultry or meat being roasted.

In accordance with the invention, an eviscerated chicken, for example, placed vertically on the new apparatus may be roasted to perfection by initially heating the oven to a temperature of 220°-230° Centigrade (428°-446° Fahrenheit) and thereafter roasting the poultry at that temperature for approximately ten minutes. Subsequently, the temperature is reduced to 180°-200° C. (356°-392° F.) and roasted for another approximately 25 to 30 minutes.

The resultant roasted chicken is extraordinarily flavorful and is extraordinarily free of fat. During the roasting process, the liquid initially placed in the reservoir 19 steams and poaches the poultry from the inside while fat from the roasting poultry drips into the pan 10 as will be understood. The new apparatus is simple to manufacture and use. It may be easily cleaned by separating the two elements from one another. It may be easily and conveniently stored. The resultant cooked poultry or meat is tasty, substantially fat-free, and attractive in appearance. Moreover, the combination interior poaching and exterior roasting reduces overall cooking time in comparison with conventional roasting apparatus and techniques.

Figure 2:
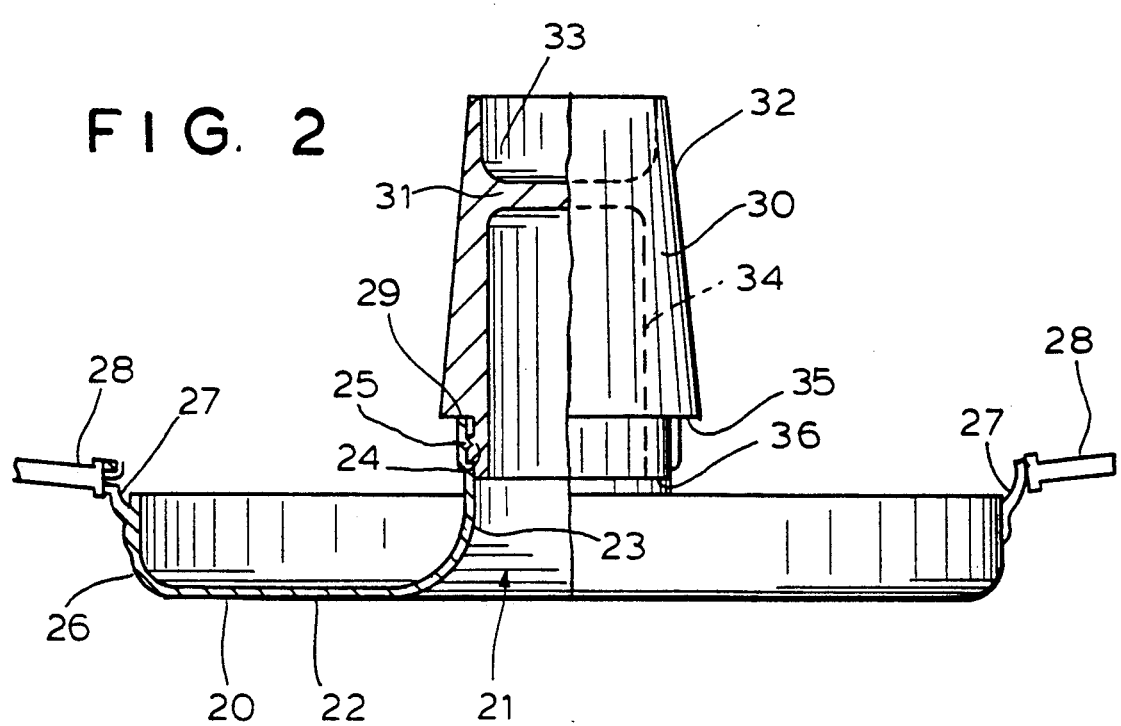
FIG. 2 is a preferred embodiment of the roasting apparatus of the invention.

Referring now to FIG. 2, an alternate preferred embodiment of the invention is shown wherein a supporting pan 20 (ceramic or metal) having a bell shaped opening 21 formed therethrough is provided to support a heat-resistant glass conical poultry/meat support 30 thereon. The pan 20 has an annular base wall 22 which surrounds the bell shaped opening 21 and has an internal cylindrical support wall 23, the upper portions of which include an internal groove 24 for engaging a mating thread 25 for locking the lowermost portion of the glass cone 30 to the pan. Circumscribing walls 26 of the pan member 22, which pan member is formed of an appropriate heat conducting ceramic or a metal such as aluminum or steel, includes upstanding lifting lugs 27 to which separable handle members 28 may be temporarily attached for the purposes of removing the hot pan from the oven after cooking is completed.

The glass vertical poultry/meat support 30 shown in FIG. 2 is in the form of a truncated cone that includes a horizontal internal wall 31 which, with the outer side walls 32 of the rack, define a reservoir 33 into which the fluid for poaching/steaming the roasting meat may be placed during cooking. The lowermost portions of the vertical glass cone 30 have an open cylindrical chamber 34 as shown.

It will be appreciated that the oven heat may be quickly and efficiently transferred directly by hot air to the internal portions of the cone 30 through the bell shaped opening 21 which communicates with the internal cylindrical portions of the cone 30 as will be understood.

In use, the roaster of FIG. 2 functions in the same manner as the roaster in FIG. 1. That is to say that sufficient fluid, generally advantageously flavored, is deposited in the internal reservoir to correspond with the weight of the poultry or meat being roasted. To that end, if desired, an appropriate calibrated scale (not shown in FIG. 2) may be etched into the outer surface 32 of the vertical cone 30 at the upper portions to indicate appropriate fill levels of the reservoir corresponding to the weight of the poultry/meat being roasted. In the embodiment of FIG. 2, the separate glass vertical, conical support is attached to the pan directly to a support surface formed integrally with pan. In the case of the FIG. 2 embodiment, the support surface is an internal groove adapted to mate with a corresponding male element 25 to form a threaded or bayonet "quick-connect" connection which is solid and capable of supporting the weight of a superimposed piece of meat or poultry to be supported vertically during roasting. To that end, the uppermost portion of the wall 23 forms a stop surface 29 which directly engages the underside 35 of an undercut formed at the lower portions of the roasting cone 30 between the locking thread 25 and the lowermost portion 36 of the conical rack element 30.

It will be appreciated that the new improved roasting apparatus of the present invention provides means for providing a poaching or moisturizing of internal surfaces of a roast while the external surfaces are being directly roasted by the comparatively dry hot air of an oven. The result is a substantially fat-free flavorful and attractive roast cooked in an abbreviated time.

While a preferred apparatus for roasting poultry and meat has been disclosed herein, it will be apparent to those skilled in the art that certain further modifications may be made without departing from the broad principles of the present invention, which shall be limited only to the scope of the appended claims.

I claim:

1. A roasting apparatus comprising:
   a. a supporting pan having a flat bottom, an upstanding circumscribing flange which supports at central portions thereof a vertical roasting support element;
   b. said vertical roasting element being in the form of a separable truncated conical element having internal surfaces which define a liquid retaining reservoir;
   c. whereby a portion of poultry or meat to be roasted may be supported on the outer surfaces of said upstanding conical element with interior portions of said poultry or meat being exposed to the reservoir and to vapor generated from liquid in said reservoir;
   d. said pan including a central opening therein defined by a cylindrical upstanding support member; and
   e. said truncated conical element being fastened at lowermost portions to said upstanding flange by quick-connect means.

2. The apparatus of claim 1, further characterized in that
   a. the vertical conical element is heat-resistant glass and includes a calibrated scale on the outer surfaces thereof which is indicative of a series fill levels of the internal reservoir; and
   b. the pan is metal or ceramic.

3. The apparatus of claim 1, which further includes detachable handle means for supporting said pan and handling it when it is at elevated temperatures.

4. The apparatus of claim 2, wherein said truncated conical element has a separate upper reservoir portion and a lower hollow portion.

5. A roasting apparatus comprising:
   a. a supporting pan having a flat bottom, an upstanding circumscribing flange which supports at central portions thereof a vertical roasting support element;
   b. said vertical roasting element being in the form of a separable truncated conical element having internal surfaces which define a liquid retaining reservoir;
   c. whereby a portion of poultry or meat to be roasted may be supported on the outer surfaces of said upstanding conical element with interior portions of said poultry or meat being exposed to the reservoir and to vapor generated from liquid in said reservoir;
   d. said pan including quick-connect means for attaching said roasting element.

* * * * *